United States Patent [19]
Cullen

[11] Patent Number: 5,904,031
[45] Date of Patent: *May 18, 1999

[54] AGRICULTURAL BAGGING MACHINE

[75] Inventor: Steven R. Cullen, Astoria, Oreg.

[73] Assignee: Versa Corporation, Astoria, Oreg.

[ * ] Notice: This patent is subject to a terminal disclaimer.

[21] Appl. No.: 08/374,131

[22] Filed: Jan. 18, 1995

Related U.S. Application Data

[63] Continuation of application No. 08/200,765, Feb. 23, 1994, abandoned.

[51] Int. Cl.⁶ .................................................. B65B 1/24
[52] U.S. Cl. .............................................. 53/567; 53/527
[58] Field of Search ............................... 53/527, 530, 567

[56] References Cited

U.S. PATENT DOCUMENTS

| | | | |
|---|---|---|---|
| 1,757,401 | 5/1930 | Thomas | 198/533 |
| 2,689,597 | 9/1954 | Kinnear | 198/533 |
| 3,815,323 | 6/1974 | Longo | 53/530 |
| 4,149,547 | 4/1979 | Komossa et al. | 198/533 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,621,666 | 11/1986 | Ryan | 141/114 |
| 4,688,480 | 8/1987 | Ryan | 100/144 |
| 4,949,633 | 8/1990 | Johnson et al. | 100/65 |
| 5,297,377 | 3/1994 | Cullen | 53/527 |
| 5,355,659 | 10/1994 | Cullen | 53/567 |
| 5,408,809 | 4/1995 | Cullen | 53/567 |
| 5,408,810 | 4/1995 | Cullen | 53/567 |
| 5,425,220 | 6/1995 | Cullen | 53/527 |
| 5,464,049 | 11/1995 | Cullen | 53/567 |

*Primary Examiner*—Joseph J. Hail, III
*Assistant Examiner*—Rodney Butler
*Attorney, Agent, or Firm*—Zarley, McKee, Thomte Voorhees & Sease; Dennis L. Thomte

[57] ABSTRACT

An agricultural bagging machine including a feed hopper having a sloped front wall and a sloped back wall with the sloped walls being substantially parallel to one another to reduce or prevent bridging of the material in the hopper.

3 Claims, 2 Drawing Sheets

AGRICULTURAL BAGGING MACHINE

This is a continuation of application Ser. No. 08/200,765 filed on Feb. 23, 1994, abandoned.

BACKGROUND OF THE INVENTION

1. Field of the Invention

This invention relates to an agricultural bagging machine and more particularly to an agricultural bagging machine having a hopper designed to substantially reduce the bridging of the silage material or the like within the hopper.

2. Background Information

Agricultural bagging machines have been employed for several years to bag or pack silage or the like into elongated plastic bags. Two of the earliest bagging machines are disclosed in U.S. Pat. Nos. 3,687,061 and 4,046,068. In most prior art bagging machines, silage or the like is supplied to the forward or intake end of the bagging machine and is fed to a rotor which conveys the silage into a tunnel on which the bag is positioned so that the bag is filled. In most prior art bagging machines, the rotor is located at the lower end of a hopper. Ordinarily, the hopper includes a sloped forward wall and a substantially vertically disposed back wall. The sloped front wall is sometimes referred to as a hopper panel while the back wall is sometimes referred to as a face panel.

Inasmuch as the front wall of the conventional hopper is sloped and inasmuch as the back wall of the conventional hopper is substantially vertically disposed, the vertical cross section of the hopper has a funnel shape. When the feed stuffs or silage are put in the hopper of the machine, the funnel-shape may cause the material to build up until the material bridges over the rotor causing the rotor to take in less feed or none at all depending on the degree of bridging.

SUMMARY OF THE INVENTION

An improved agricultural bagging machine is disclosed which includes a hopper at the forward end of the machine wherein the hopper includes a sloped front wall and a sloped back wall wherein the sloped front and back walls are substantially parallel to one another so that bridging of the silage material in the hopper is substantially reduced and/or prevented.

It is therefore a principal object of the invention to provide an improved agricultural bagging machine.

A further object of the invention is to provide an improved agricultural bagging machine including a hopper thereon having a sloped front wall and a sloped rear wall with the sloped walls being substantially parallel to one another to prevent bridging of the material within the hopper.

Yet another object of the invention is to provide an agricultural bagging machine which is economical of manufacture, durable in use and refined in appearance.

These and other objects will be apparent to those skilled in the art.

DESCRIPTION OF THE PREFERRED EMBODIMENT

Figure 1:
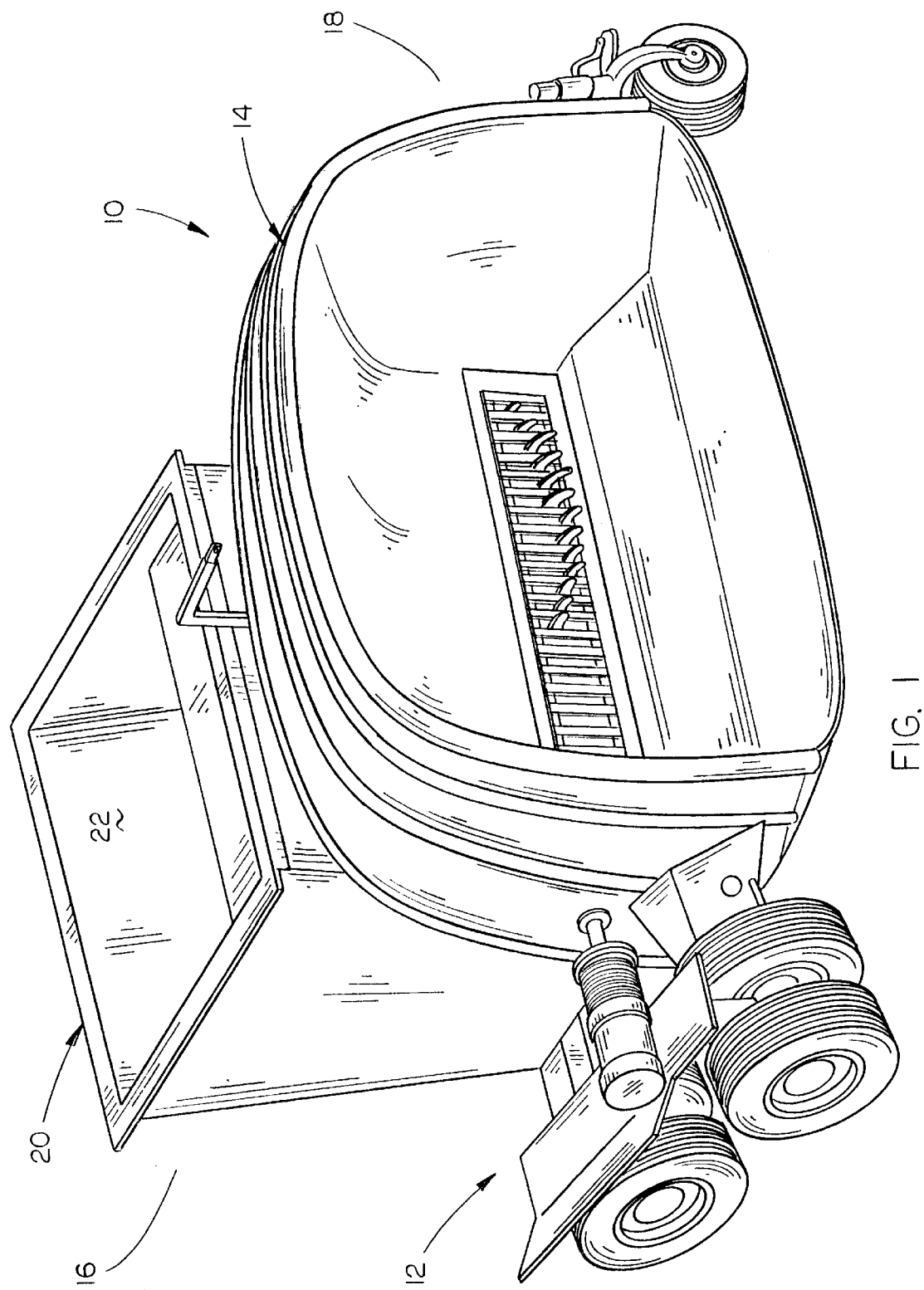
FIG. 1 is a rear perspective view of the bagging machine of this invention.
Figure 2:
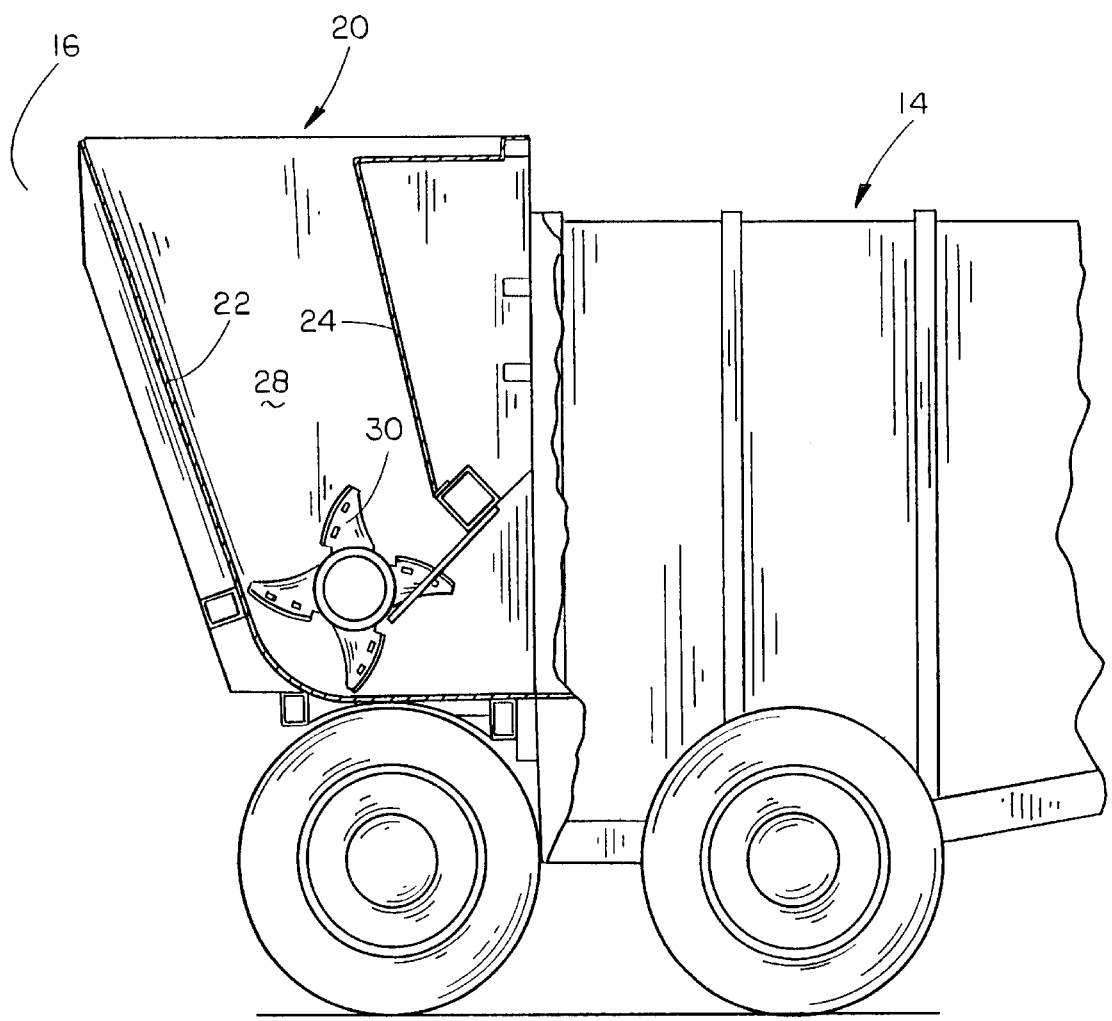
FIG. 2 is a vertical sectional view of the hopper of the improved bagging machine of this invention.

The numeral 10 refers to an agricultural bagging machine which is substantially conventional in design except for the new design of the hopper as will be described hereinafter. Machine 10 includes a wheeled frame means 12 having a tunnel 14 mounted thereon upon which is normally positioned the open mouth of a conventional agricultural bag. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. Hopper means 20 includes a sloped front wall 22, sloped rear wall 24 and opposite side walls 26 and 28. A rotatable rotor 30 of conventional design is illustrated and is located at the lower end of the hopper means 20 for forcing the material to be bagged into the tunnel 14 and into the bag in conventional fashion.

The conventional hopper design of the prior art bagging machines includes a sloped front wall and a substantially vertically disposed rear wall. The sloped front wall and the substantially vertically disposed back wall of the prior art machine creates a funnel-shape which results in a bridging of the material in the hopper. The hopper design of this invention as disclosed herein substantially reduces or eliminates the bridging of the material in the hopper since the sloped front wall and the sloped rear wall are substantially parallel to one another to eliminate the funnel shape of the hopper. Thus, the hopper vertical cross-section remains substantially constant from the upper end to the lower end thereof. The substantially constant vertical cross-section prevents the "wedging" of the material in the hopper to reduce bridging.

Thus, it can be seen that the invention of this application achieves substantially all of its stated objectives.

I claim:

1. A bagging machine for bagging material into agricultural bags comprising:

a frame means having rearward and forward ends;

a tunnel means on said frame means and having an intake end for receiving the material to be bagged and an output end adapted to receive the mouth of an agricultural bag;

a horizontally disposed rotor means at the intake end of said tunnel means for forcing the material to be bagged into said tunnel means and into said bag, and a hopper means on said frame means for receiving the material to be bagged, said hopper means having an open upper end and a lower end;

said hopper means including a sloped front wall, a sloped rear wall, and side wall extending therebetween;

said walls being fixed and non-movable;

said sloped front wall and said sloped rear wall each having upper and lower ends;

said rotor means being positioned between the lower end of said sloped front wall and the lower end of said sloped rear wall;

said front and rear walls extending upwardly and forwardly with respect to said rotor means.

2. The bagging machine of claim 1 wherein said frame means is wheeled.

3. A bagging machine for bagging material into agricultural bags comprising:

a frame means having rearward and forward ends;

a tunnel means on said frame means and having an intake end for receiving the material to be bagged and an output end adapted to receive the mouth of an agricultural bag;

a horizontally disposed rotor means at the intake end of said tunnel means for forcing the material to be bagged into said tunnel means and into said bag, and a hopper means on said frame means for receiving the material to be bagged, said hopper means having an open upper end and a lower end;

said rotor means being in communication with the lower end of said hopper means;

said hopper means including a sloped front wall, a sloped rear wall, and side walls extending therebetween;

said walls being fixed and non-movable;

said sloped front wall and said sloped rear wall each having upper and lower ends;

said sloped front and rear walls being sloped for their entire lengths;

said rotor means being positioned between the lower end of said sloped front wall and the lower end of said sloped rear wall;

said front and rear walls extending upwardly and forwardly with respect to said rotor means;

said sloped front and rear walls being fixed in a substantially parallel relationship to one another, to reduce bridging of the material within said hopper means.

* * * * *